April 15, 1958     A. G. LIBERTO     2,831,176
COURTESY LIGHT FOR VEHICLES
Filed March 14, 1955
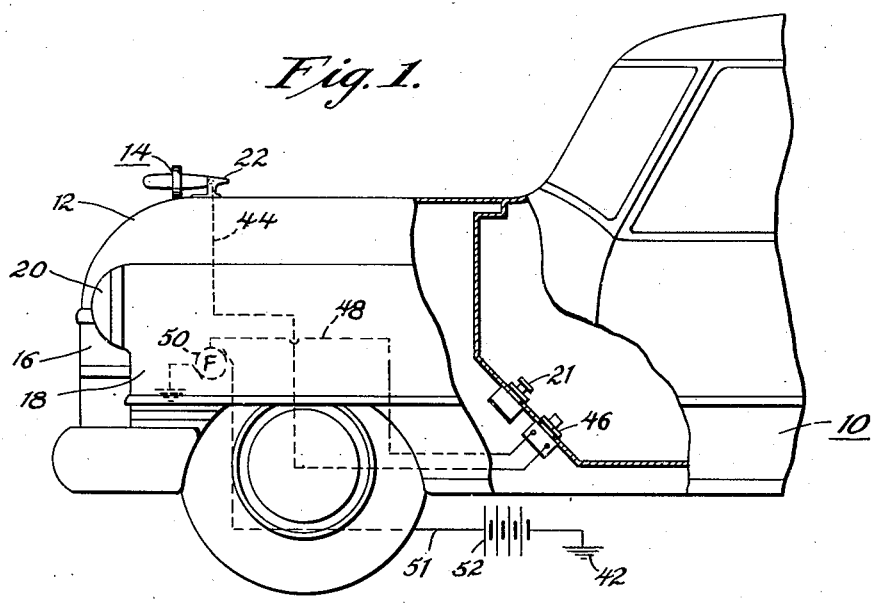
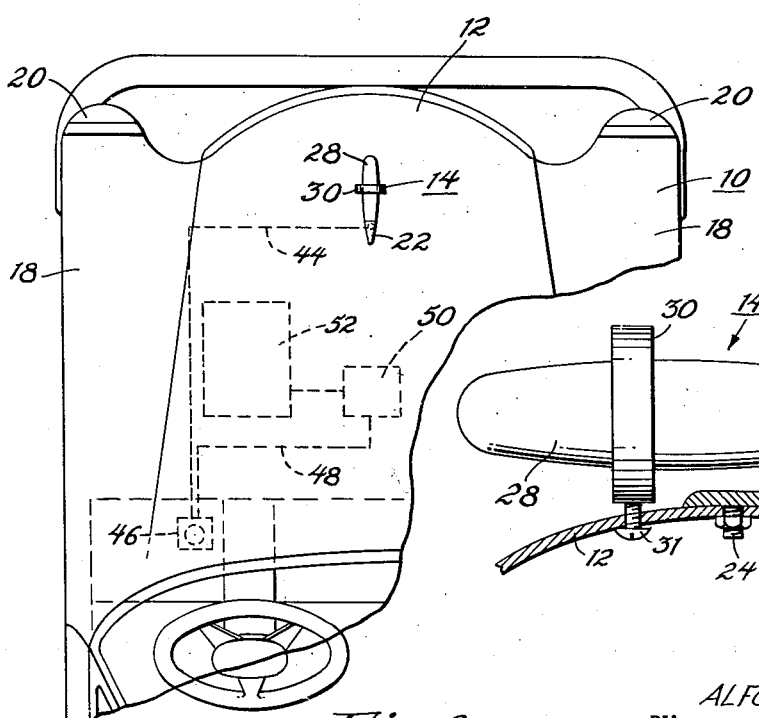
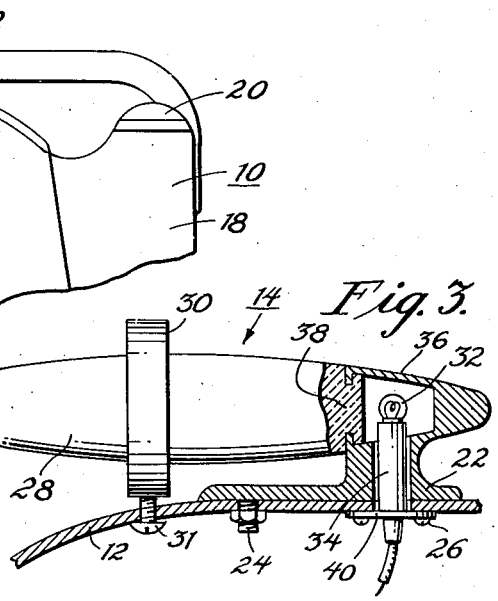
INVENTOR.
ALFONSO G. LIBERTO
BY Arthur H. Seidel
ATTORNEY.

April 15, 1958     A. G. LIBERTO     2,831,176
COURTESY LIGHT FOR VEHICLES
Filed March 14, 1955     2 Sheets-Sheet 2
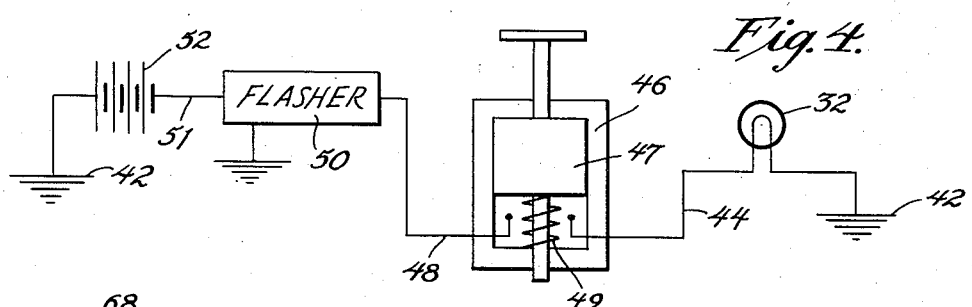
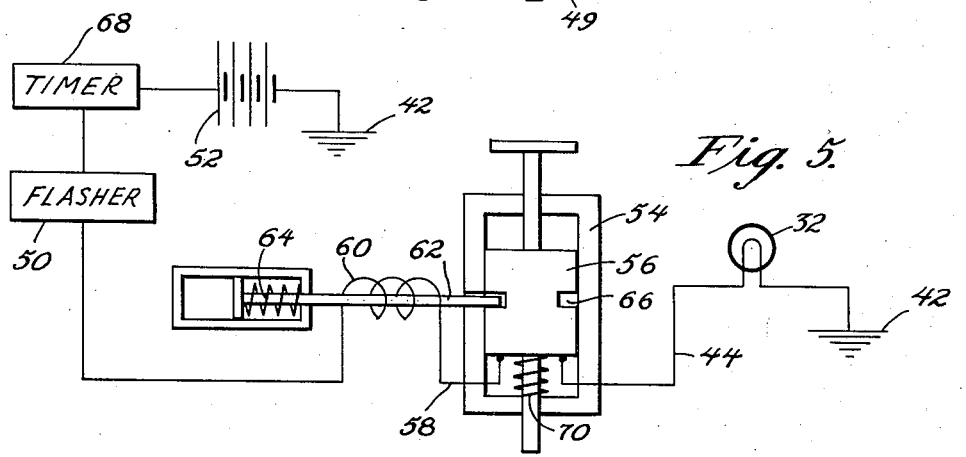
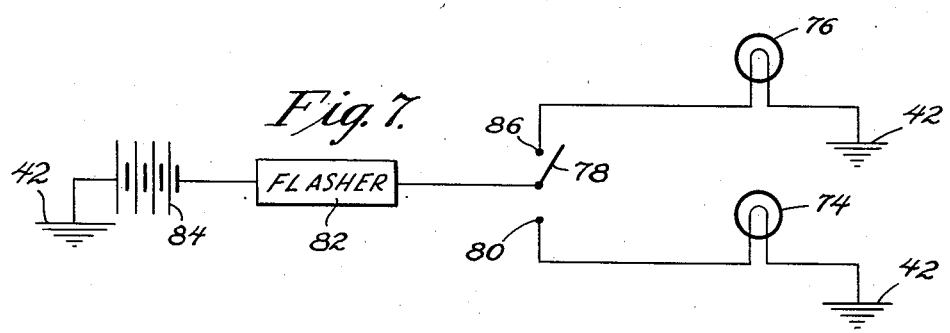
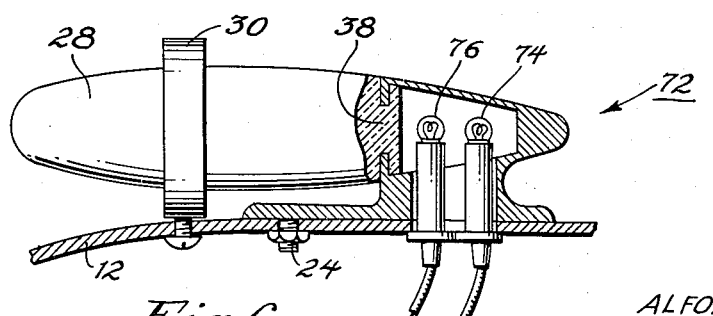
INVENTOR.
ALFONSO G. LIBERTO
BY Arthur H. Seidel
ATTORNEY.

2,831,176
Patented Apr. 15, 1958

2,831,176

COURTESY LIGHT FOR VEHICLES

Alfonso G. Liberto, Philadelphia, Pa.

Application March 14, 1955, Serial No. 493,913

1 Claim. (Cl. 340—74)

The present invention relates to a courtesy light for automotive vehicles for signalling to pedestrians and vehicles in other lanes an intention to proceed or to stop.

There is a serious need for a signal that may be readily observed at either side of a vehicle. Thus, when an automotive vehicle is moving down a thoroughfare adjacent a line of parked cars, there is no adequate means presently provided for the driver of the moving vehicle to advise the driver of a parked car seeking to enter the thoroughfare as to whether he will be given the opportunity to do so. Particularly at night, when it is not possible for the drivers to readily see each other, misunderstandings may lead to collisions.

Moreover, at intersections where the rules of the road are difficult to follow, it is desirable for one driver to be able to signal his intentions to another angularly disposed vehicle.

Prior courtesy lights have been suggested in which steady illumination is used. Such lights are not satisfactory because the courtesy light must serve as a signal and forcibly bring the observer's attention thereto. A steady light is readily mistaken for an ornamental light and is therefor virtually useless as a courtesy light.

An object of the present invention is the provision of a forcible courtesy light system of simple and foolproof construction.

Another object of the present invention is the provision of a courtesy light which unmistakably signals the intention of the driver to all parties on both sides and in front of him.

Other objects will appear hereafter.

For the purpose of illustrating the invention there are shown in the drawings forms thereof which are presently preferred; it being understood, however, that this invention is not limited to the precise arrangements and instrumentalities shown.

Figure 1 is a side elevation, partly in section, of the front portion of an automotive vehicle carrying an embodiment of the courtesy light of the present invention.

Figure 2 is a plan view, partly diagrammatic, of the courtesy light system of the present invention.

Figure 3 is a fragmentary sectional view of the hood portion of the vehicle of Figure 1 showing the courtesy light of the present invention.

Figure 4 is a diagrammatic circuit for the courtesy light embodiment of Figure 1.

Figure 5 is a diagrammatic circuit of another embodiment of the courtesy light system of the present invention.

Figure 6 is a fragmentary sectional view similar to Figure 3 showing another embodiment of the courtesy light of the present invention.

Figure 7 is a diagrammatic circuit for the courtesy light embodiment of Figure 6.

Referring to the drawings and initially to Figures 1, 2, 3 and 4 an embodiment of my invention is furnished in the vehicle designated 10 which includes the forwardly protruding hood 12 containing the courtesy light designated generally as 14.

Below hood 12 is radiator grill 16, and on either side of the hood 12 are fenders 18 containing headlights 20, which may be connected to dimmer switch 21 in the conventional manner.

The courtesy light 14 includes a body portion designated 22 of metal or the like which is secured at the front center portion of hood 12 by means of a front bolt 24 which extends through an aperture formed in hood 12, and a pair of rear screws 26 which extend through the hood 12 and are received in body portion 22.

Body portion 22 carries a signal rod 28 made of "Lucite," which is further supported by spider ring bearing support 30 which is bolted to hood 12 by screw 31. Lucite is a methyl methacrylate polymer which has the property of conveying and emitting light along its length, so that the entire length of signal rod 28 is lit up when it is illuminated from its rear. This is accomplished by light bulb 32 which is carried in a bayonet socket 34 within a housing 36 of metal or the like, opaquely closed at all sides, except for aperture 38 which is occupied by the rear end of signal rod 28. Socket 34 is retained in position by means of screws 26 which pass through apertures in socket flange 40, whose upper surface is flush with the undersurface of hood 12.

Preferably, signal rod 28 is tinted or colored green, so that when it is illuminated by a conventional white light bulb 32, it casts off a green light. Alternatively, a colorless sign rod 28 may be used and a green light bulb 32 inserted into socket 34. While a green colored signal rod 28 is preferred, other colors or a white rod may be used.

The circuit for operating light bulb 32 is shown in Figure 4.

One terminal of bulb 32 is connected to the ground designated in every case by the numeral 42. This may be accomplished through the body of the vehicle, or by a separate lead. The other terminal of bulb 32 is connected by wire 44 to switch 46 which may be mounted on the floor of the car body adjacent the steering wheel column near the left foot of the driver. Switch 46 is a spring-urged switch of the type that is normally open, e. g. piston element 47 is spring urged out of closed position by spring 49, but when, and so long as, pressure is applied thereto, as by the left foot of the driver, is closed.

Switch 46 is connected by wire 48 to a flasher 50 of conventional type, such as that shown in Jorgenson Patent 2,076,275, which if need be, may be grounded. Flasher 50 is connected by wire 51 to one pole of the vehicle's energizing battery 52 (either directly or through a terminal box) which may be the usual wet cell storage battery. The other pole of energizing battery 52 is grounded.

The operation of the courtesy light system of Figures 1 through 4 is as follows:

The driver of vehicle 10 may be assumed to be proceeding through traffic down a thoroughfare when he sees a driver in a parked vehicle at one side of the thoroughfare attempting to enter the traffic. Wishing to signal the driver of the parked vehicle that he may enter the traffic ahead of him, the driver of vehicle 10 presses his left foot down upon the movable element of switch 46 closing the courtesy light circuit through piston element 47 contacting both wires 44 and 48. This, in turn energizes bulb 32 which is controlled by flasher 50. Bulb 32 emits an intermittent blinking signal along signal rod 28, which may be seen by both the driver of the parked vehicle who is at one side of vehicle 10, and the oncoming traffic which is in front of and at the other side of vehicle 10. The driver of the parked vehicle is apprised that he is being permitted to enter the stream of traffic, and the oncoming traffic is apprised that this action is to take place.

In the embodiment shown in Figure 5 the switch 54, instead of being of the pressure contact type as switch 46, is a foot switch which remains in closed position (as shown in Figure 5) after being downwardly urged by the left foot of the driver.

Thus, when the switch piston 56 is urged downwardly by the foot of the driver it connects wire 44 with wire 58, closing the circuit and energizing solenoid 60 urging armature 62 against and overcoming the action of spring 64 into an annular groove 66 in piston 56. Intermediate solenoid 60 and battery 52 is flasher 50 and a timer 68, such as a thermocouple timer which automatically breaks the circuit after a predetermined time interval, such as 10 seconds, or the like.

When the circuit is broken, armature spring 64 withdraws armature 62 from annular groove 66. Piston 56 is then urged upwardly, breaking the circuit, by the action of spring 70.

In this embodiment the driver presses down on switch 54 which closes the circuit, causing the courtesy light 32 to blink on and off for a period regulated by timer 68. It is not necessary that the left foot of the driver be in continuous contact with switch 54, as in the circuit shown in Figure 4.

Referring to Figures 6 and 7 there is shown a courtesy light designated 72 which is provided with a pair of bulbs, namely green bulb 74 and red bulb 76.

As shown in Figure 7 bulbs 74 and 76 are connected to a 2-way switch 78 which normally is in neutral position and open. Switch 78 is preferably mounted on the dashboard of the vehicle. Switch 78 may be thrown to post 80 closing the circuit to bulb 74 which includes flasher 82 and battery 84. Green bulb 74 indicates to the person receiving the signal that he has the right of way.

Switch 78 may also be thrown to post 86 closing the circuit to bulb 76. Red bulb 76 indicates to the person receiving the signal that he will not be accorded the right of way.

The present invention may be embodied in other specific forms without departing from the spirit or essential attributes thereof and, accordingly, reference should be made to the appended claim, rather than to the foregoing specification as indicating the scope of the invention.

I claim:

A right of way signal for an automotive vehicle including an elongated torpedo-shaped solid rod of light-emitting and transmitting diaphanous material which emits light along its entire length, a generally opaque housing at one end of said rod, said opaque housing having an end into which the torpedo-shaped solid rod extends, with a radially inwardly extending flange of said housing being received within a circular groove of said rod, said housing being positioned on the longitudinal axis of said torpedo-shaped solid rod, a major portion of the outer surface of said housing being continuous with the outer surface of said rod, a spider bearing support intermediate the ends of said torpedo-shaped solid rod embracing said torpedo-shaped solid rod, means extending beneath said spider bearing support for securing the signal to the hood of an automotive vehicle, an opening in the floor of said opaque housing, at least one bulb extending upwardly through said opening and disposed within said housing, the longitudinal axis of said bulb being perpendicular to the longitudinal axis of said torpedo-shaped rod, said bulb being juxtaposed to the end of said torpedo-shaped rod whereby said bulb supplies light to said torpedo-shaped rod, means on the bottom of said housing for securing said housing to the hood of an automotive vehicle, a tubular support and electrical conduit for said bulb, and means carried by said tubular support outside of said housing for securing said tubular support to the hood of an automotive vehicle.

References Cited in the file of this patent

UNITED STATES PATENTS

| | | |
|---|---|---|
| 1,489,818 | Cinquini | Apr. 8, 1924 |
| 1,559,010 | Schwieger | Oct. 27, 1925 |
| 1,893,369 | Jaros | Jan. 3, 1933 |
| 2,265,095 | Adler | Dec. 2, 1941 |
| 2,270,587 | Hall | Jan. 20, 1942 |
| 2,306,590 | Chambers | Dec. 29, 1942 |
| 2,340,530 | Hefner | Feb. 1, 1944 |
| 2,566,404 | Daon | Sept. 4, 1951 |
| 2,656,426 | Dibelka | Oct. 20, 1953 |